(12) United States Patent  
Villarruel et al.

(10) Patent No.: US 8,265,490 B2
(45) Date of Patent: *Sep. 11, 2012

(54) TRANSAMPLIFIER, SYSTEM AND METHOD FOR AMPLIFICATION OF OPTICAL SIGNALS AT PLURAL WAVELENGTHS

(75) Inventors: Fernando X. Villarruel, Romeoville, IL (US); Steven C. Condra, Plainfield, IL (US); Yihong Chen, Naperville, IL (US); Kevin L. Sweeney, Naperville, IL (US); James W. Sulhoff, Naperville, IL (US)

(73) Assignee: Cisco Technology, Inc., San Jose, CA (US)

( * ) Notice: Subject to any disclaimer, the term of this patent is extended or adjusted under 35 U.S.C. 154(b) by 574 days.

This patent is subject to a terminal disclaimer.

(21) Appl. No.: 12/473,736

(22) Filed: May 28, 2009

(65) Prior Publication Data

US 2009/0232500 A1    Sep. 17, 2009

Related U.S. Application Data

(63) Continuation-in-part of application No. 11/765,152, filed on Jun. 19, 2007, now Pat. No. 7,903,980.

(51) Int. Cl.
*H04B 10/04* (2006.01)
*H04B 10/12* (2006.01)

(52) U.S. Cl. .................................. 398/193; 398/201

(58) Field of Classification Search ............... 398/90, 398/193, 201
See application file for complete search history.

(56) References Cited

U.S. PATENT DOCUMENTS

| | | | | |
|---|---|---|---|---|
| 6,081,636 A | * | 6/2000 | Kinoshita | 385/24 |
| 7,466,925 B2 | | 12/2008 | Iannelli | |
| 7,903,980 B2 | * | 3/2011 | Villarruel et al. | 398/193 |
| 2003/0058899 A1 | * | 3/2003 | Islam | 372/6 |
| 2004/0208622 A1 | * | 10/2004 | Grosz et al. | 398/160 |
| 2005/0047799 A1 | * | 3/2005 | Coppinger et al. | 398/188 |
| 2006/0140642 A1 | * | 6/2006 | Brolin | 398/183 |
| 2006/0210282 A1 | | 9/2006 | Iannelli | |
| 2006/0251425 A1 | * | 11/2006 | Kupershmidt et al. | 398/147 |
| 2006/0263094 A1 | * | 11/2006 | Setti et al. | 398/152 |
| 2008/0273874 A1 | | 11/2008 | Ramachandran et al. | |

* cited by examiner

*Primary Examiner* — Nathan Curs

(74) *Attorney, Agent, or Firm* — Tarolli, Sundheim, Covell & Tummino LLP

(57) ABSTRACT

Disclosed herein are embodiments of a device, method of use and system for an analog multi-wavelength transamplifier. The transamplifier embodiments described herein allow the use of multiple wavelengths to segment logical service groups, such as for use in a CATV distribution system and a FTTH system having a broadband overlay. Improved optical signal power performance can be achieved by using direct modulating transmitters and maintaining polarization of the optical signals that are modulated by a phase modulator, such as an external waveguide.

20 Claims, 8 Drawing Sheets

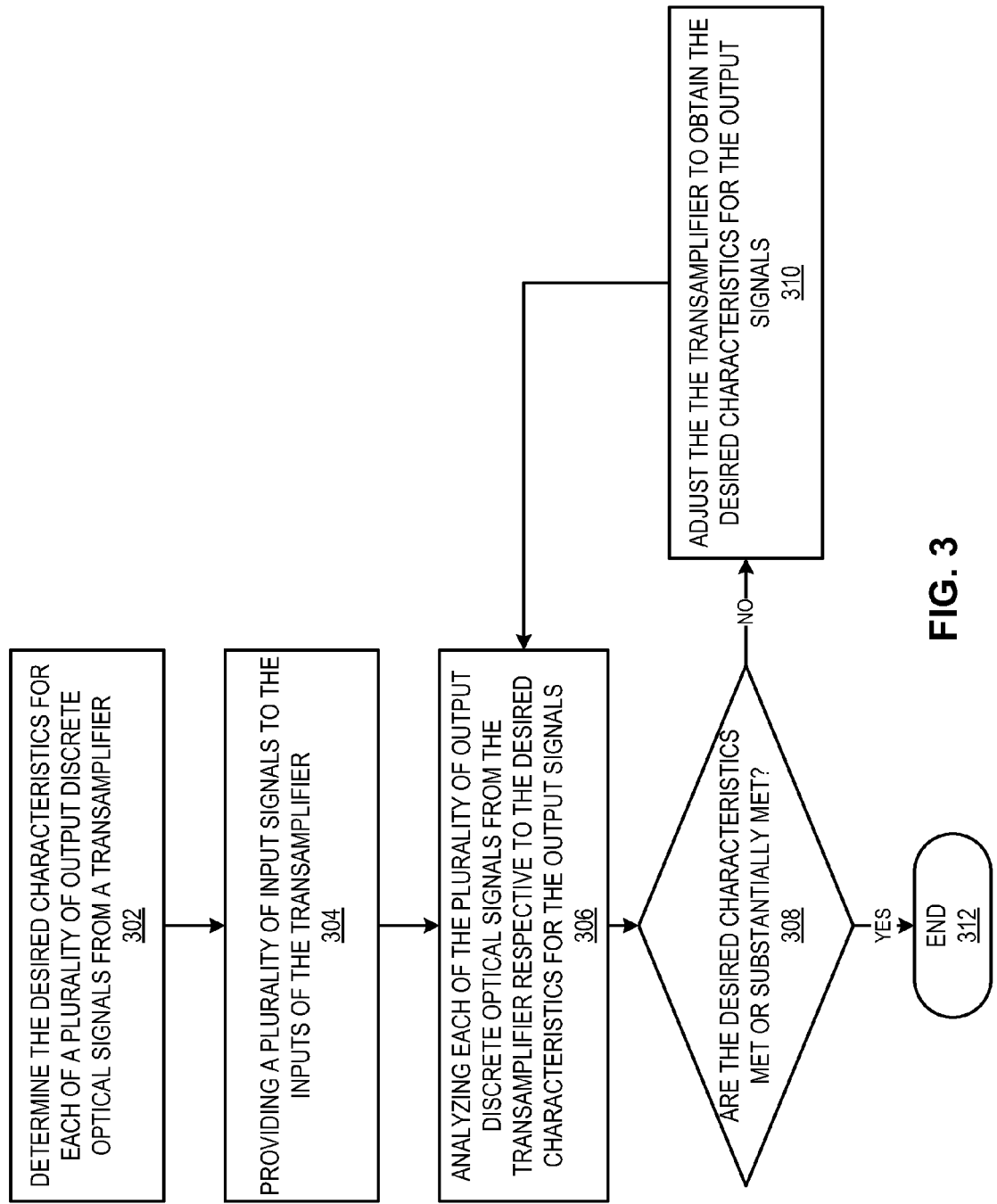

TRANSAMPLIFIER, SYSTEM AND METHOD FOR AMPLIFICATION OF OPTICAL SIGNALS AT PLURAL WAVELENGTHS

CROSS-REFERENCE TO RELATED APPLICATION

This application is a continuation in part of U.S. application Ser. No. 11/765,152 filed on Jun. 19, 2007 now U.S. Pat. No. 7,903,980, and entitled, "AMPLIFIED WAVELENGTH BROADBAND VIDEO DISTRIBUTION ARCHITECTURES USING AN EXTERNAL WAVEGUIDE", which is incorporated herein by reference.

TECHNICAL FIELD

This disclosure relates generally to optical signal transmission and, more specifically, to a device, system and method for transamplification of optical signals at a plurality of wavelengths.

BACKGROUND

In the mid 1990's it became obvious that the world-wide consumer appetite for bandwidth hungry applications would eventually mean a shift not only in the consumer electronics that deliver the "experience," but also in the way that access networks would be deployed and used. At the time, while advances in data delivery over legacy copper networks (DSL for instance) and the implementation of hybrid-coaxial deployments seemed to suffice it was clear that in a short time both of these methods would have severe shortcomings to available end line customer applications. By the early years in this decade, the accelerated availability of high definition television programming, video-on-demand, VoIP, peer to peer gaming, IM, video uploading, etc, made the need for improved access immediate.

In 1998, ITU-T released the standard G.983.1, incorporated herein by reference, that was recommended by the Full Service Access Network (FSAN) group with the intent of working towards a truly broadband fiber access network. This initiative is generally known as the FTTH BPON, ("B" for broadband, and "PON" for passive optical network). One goal of this recommendation was making the delivery of data burdening applications, particularly high end video, as inexpensive as possible. At the physical layer, this means fully leveraging the almost unlimited bandwidth transmission capacity of a fiber waveguide, and for cost reasons sharing one central optical line terminal (OLT) over as many optical network units (ONU) as possible in a point to multipoint distribution configuration. A typical ratio is 16-64 ONU per OLT.

Implicit in the BPON recommendation is the ability to deliver the voice, data and video (e.g., the "triple play") with specific designation to meet these requirements even at the physical layer. The type of information slated for transport in this specification can be broken into three types of services: broadcast (general and directed or narrowband), downstream, and return path services.

In a typical deployment there can be multiple hundreds up to thousands of PON in operation. Many of these PON are serviced by the same backbone transport system. "Downstream" is the specific information only particular to one ONU in a PON. Its delivery is managed by the OLT and dependent on the transport and networking specification use. Examples of downstream service include telephony, video on demand, and high speed data via ATM.

"Broadcast" is information that all ONUs of a particular OLT receive equivalently and exactly. Broadcast includes, for instance, nationally syndicated TV channels such as NBC, CBS, and ABC, or locally syndicated channels such as, for example, city council TV. "General broadcast" occurs when the same information is provided to all ONUs of many OLTs in a deployment (e.g., NBC, ABC, CBS, etc.) A "directed broadcast" occurs when all ONU's of a considerable subset of OLTs from of a deployment receive the same information (e.g., city council TV). Broadcast information and narrowcast information can be any form of data, voice or video. For example, in one instance broadcast information can be data such as QAM to a modem. Likewise, narrowcast information can be data such as QAM to a single modem or a subset of modems.

"Return path" is the upstream information that allows a closed loop information exchange system.

Generally, in a typical PON architecture there are four optical bands of operation: the 1270 nm to the 1350 nm band for the upstream, the coarse wave-division multiplexing (CWDM) band above the water peak up to 1480 nm for future upgrades, the 1480 nm to 1500 nm for the downstream, and the 1550-1560 nm range for downstream broadcast distribution. The hardware implemented is also particular with function and expectation. At a central office (CO) resides an OLT, which is an ATM based transceiver to transmit at 1490 nm and receive a 1310 nm signal generated by the ONU module. Also, at the CO is the placement of a 1550 nm transmission and the optical amplification necessary to transmit a broadband RF spectrum signal. The combination of the downstream signals and the drop of the upstream signal at the CO happen through a passive wide band filter. The input/output of this passive multiplexer is incident on one optical fiber and per the ITU specification can have a maximum logical reach of about 20 km for the BPON, with some distance variation for GPON and EPON configurations. Nearing the end of this PON distance there is a high count 1×N optical splitter, after which each fiber terminates at an ONU, typically a residence or business of some sort.

A typical ONU comprises an optical triplexer, which takes the input from the 1490 and 1550 nm upstream signals and separates them for independent reception, and takes the upstream 1310 signal and adds it to the PON fiber. Also comprising the ONU are the opto-to-electrical conversion properties of the receiver diode, amplification, and AGC circuit sets that prepare the signal for demodulation at the TV or set top box video receivers. The purpose of the video overlay (over the optical network (e.g., PON)) is to transmit a portion of the radio frequency spectrum (55 MHz to 1 GHz) to each ONU, a proven technology for high quality transmission of analog amplitude modulation and QAM. QAM modulation is Quadrature Amplitude Modulation, a symbol based modulation where amplitude and phase components exist according to baseband digital subsets. The QAM symbol capacity can differ, from 64 to 1024 symbol schemes, but most typically 256 symbol modulation is used. Currently deployable transmission capacity for the video overlay is quite large, up to 6.6 Gbps, which can support up to 1256 HD video channels, or 6594 SD video channels.

This RF modulation scheme and the leveraging of its transmission capacity have been perfected over the last two decades in HFC applications. HFC architectures have a fiber trunk that terminates at a node followed by a coaxial plant that distributes signal to the end uses. However, it can be advantageous to replace the coaxial distribution with a PON.

In RF transmission links, both the electronics and optics disrupt the input signal via various noise sources. The challenge for these types of links is that these impairments must all be managed or corrected to a certain extent for efficient interpretation by the end line user. The main noise sources to contend in these systems are: Relative Intensity Noise (RIN) from transmitter laser and laser to modulator interaction, and from optical amplifiers; intermodulation noise from transmitter, fiber, and fiber scattering; diode and electronic characteristics in the optical receiver module; and fiber non-linear interaction between multiple wavelengths. The relative intensity noise penalties degrade the RF signal to noise (CNR) parameter per channel over the whole operating band, the intermodulation noise creates harmonic beating effects (CSO from second orders, CTB from third orders) spread statistically throughout the operating band, and scattering phenomena appear due to the high launch powers necessary for cost effective delivery of signal, (SBS (stimulated Brillouin scattering) and SRS (stimulated Raman scattering) for multiple wavelengths interaction). All of these if unchecked reduce the necessary quality of service.

As a point of reference, in HFC, for optical fiber terminating at a node the specifications per channel are typically carrier to noise ratio CNR>52 dBc, composite second order (CSO)<−65 dBc, and composite triple beat (CTB)<−65 dBc, while for in FTTH for fiber terminating at an ONU the specifications per channel are typically CNR>46 dBc, CSO<−53 dBc, CTB<−53 dBc. For QAM transmission at an HFC node the specification desired is typically <E-9 symbol BER (bit error rate), while for a FTTH ONU only a <1E-6 symbol BER may be required.

With respect to the noise impediments, HFC systems are intermodulation limited. Thus all the technology development, network design, and cost reduction has gone mostly towards creating hardware that can mitigate intermodulation effectively. From the perspective of optical links, this means delivering to the coaxial plant very low levels of intermodulation distortions (e.g. −65 dBc), to be degraded rapidly through RF amplifiers to end delivery at customer site with some margin on typical standard (e.g. ~53 dBc.) This limit has historically bound the evolution of optical networks in HFC. Specifically, this means that without due design provisions both at the board and systems level one would expect the CSO to go out of spec long before the CNR would.

FTTH systems, on the other hand, are more directly limited by factors of overall broadband noise sources which come from the interplay of composite laser modulation limits and in particular the shot noise coming from the optical to electrical conversion in the ONU receivers. These two points describe the maximum CNR per channel for FTTH systems. Practically, it is the case that for both technical reasons and cost scalability one wants to design FTTH architectures such that the broadband 1550 nm portions hits the receiver at the minimum value possible. For this case, FTTH systems are often referred to as shot noise limited. This limit however enables the use of multiple optical amplifiers in cascade, another distinction to HFC, where operating at optical input powers into the node higher than 0 dBm the RIN contribution from optical amplifiers can quickly dominate the CNR parameter.

One adverse, but necessary, point of comparison to HFC is that the optical link budget for PON recommendations is at or above 25 dB. It is known that while the physical limit of uncorrected sources is 7 dBm into fiber >25 km, which ultimately means that unlike for HFC links, that for FTTH the end of the optics link will be incident at a receiver at powers much lower than zero dBm, down to −8 dBm. This then leaves the receiver shot noise as the only dominant term to define the CNR for RF channels in the system, even to the point where other broadband noise terms, such as RIN from transmitters and amps are far secondary limiting factors. This benefit will become quickly apparent in the discussion of allowable optical amplifier cascades in FTTH.

SUMMARY

This invention relates generally to optical signal transmission and, more specifically, to a device, system and method for transamplification of optical signals at a plurality of wavelengths. The systems and methods disclosed herein can be used to provide a low-cost analog multi-wavelength video distribution transamplifier for hybrid-fiber and fiber deep CATV architectures and FTTH networks having a broadband overlay.

One embodiment relates to a transamplifier. The transamplifier includes a plurality of directly modulated optical transmitters, each optical transmitter receives at least one input signal and transmits a corresponding transmitter output optical signal having a respective transmitted power level and polarization. A polarization maintaining (PM) optical multiplexer has a plurality of inputs and at least one output. Each transmitter output optical signal is provided to a respective one of the plurality of inputs with substantially the same polarization. The PM optical multiplexer is configured to transmit a combined optical signal that includes each of the corresponding transmitter output optical signals with the substantially same polarization. A PM optical amplifier receives the combined optical signal and transmits an amplified combined optical signal at the output thereof such that the amplified combined optical signal has substantially the same polarization. A phase modulator is configured to modulate the amplified combined optical signal and provide a corresponding modulated combined optical signal at an output of the phase modulator.

The transamplifier can be used in a system for transporting voice, data and video signals over a fiber optic network. The system can further include an optical line termination (OLT) and an optical network unit (ONU), each of which is operatively coupled to the fiber-optic network. For example, each of the OLT and the transamplifier can provide respective input optical signals to a wavelength division multiplexer, which provides combined optical signal to the fiber optic network.

Methods can be implemented in which parameters of the transamplifier are adjusted to achieve desired operating characteristics.

BRIEF DESCRIPTION OF THE DRAWINGS

FIG. 3 is a flowchart illustrating an embodiment of a method for tuning a transamplifier according to the invention.

DETAILED DESCRIPTION

This invention relates generally to optical signal transmission and, more specifically, to a device, system and method for transamplification of optical signals at a plurality of wavelengths. The systems and methods disclosed herein can be used to provide a low-cost analog multi-wavelength video distribution transamplifier for hybrid-fiber and fiber deep CATV architectures and FTTH networks having a broadband overlay.

It will further be understood that the transamplifier embodiments described herein allow the use of multiple wavelengths, such as can be employed to segment logical service groups in a CATV distribution system and a FTTH system having a broadband overlay. Improved optical signal power performance can be achieved by using direct modulating transmitters and a phase modulator thereby decreasing the effective line-width of a signal in fiber and improve SBS suppression for improved system impact from non-linearities.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

The methods and systems may be understood more readily by reference to the following detailed description of example embodiments and to the Figures and to their previous and following description.

As described herein, a transamplifier includes a plurality of directly modulated laser sources that have their output optical signals multiplexed together, followed by a single waveguide for modulation, that is applicable for all multiplexed wavelengths. The multiplexed signal is then amplified by an optical amplifier, and the amplified signal is then de-multiplexed for high split ratios for both broadcast and narrowcast video delivery. It is also to be appreciated that the multiplexed signal can be modulated by the external waveguide before amplification, and such an arrangement is contemplated within the scope of this invention.

Figure 1A:
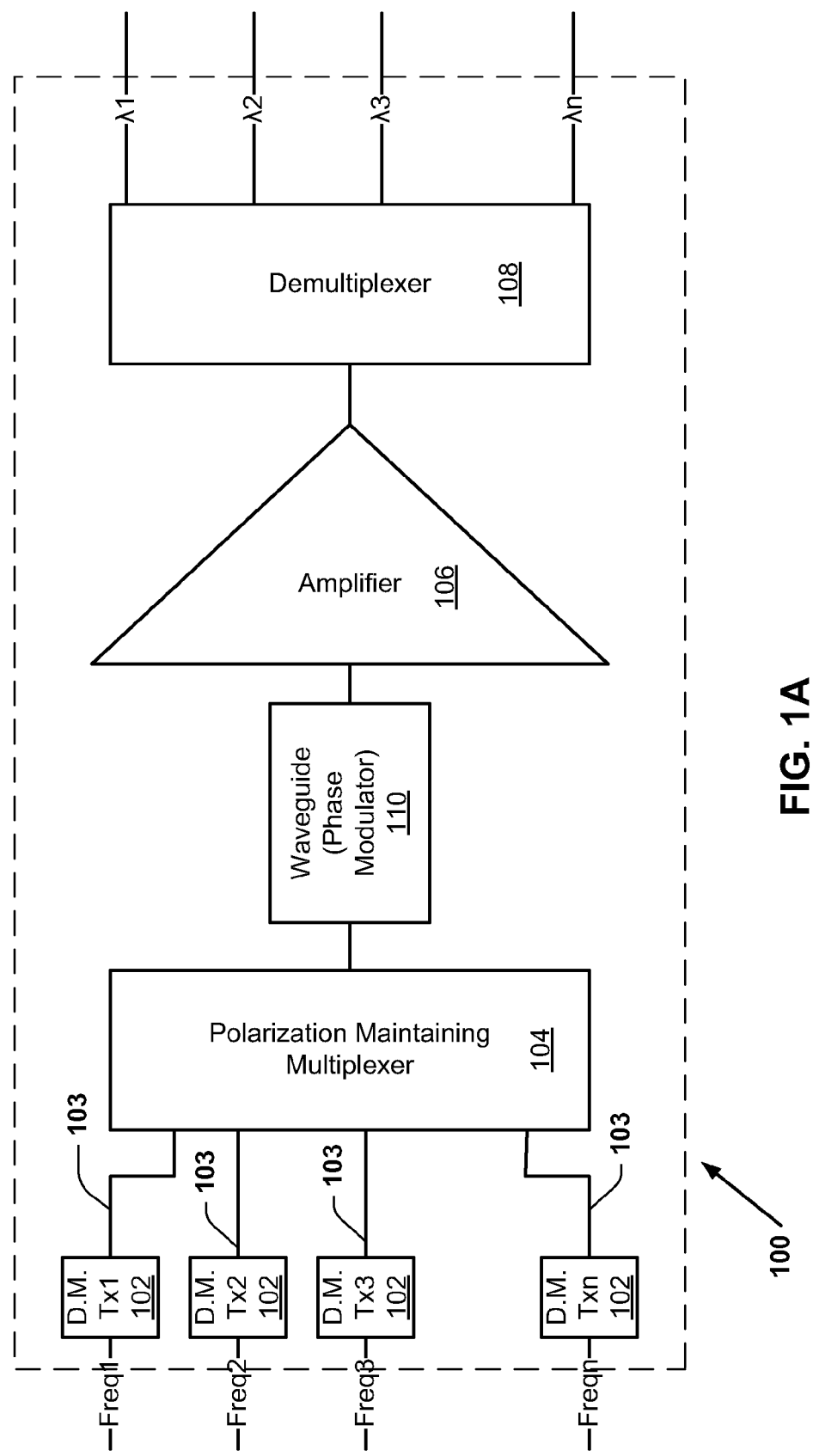
FIG. 1A depicts an example of a transamplifier in according to one embodiment according to the invention.

FIG. 1A is an illustration of a transamplifier 100 in an embodiment according to an aspect of the invention. As shown in FIG. 1A, the transamplifier 100 includes one or more directly-modulated (D.M.) optical transmitters (Tx1-Txn) 102. Each D.M. optical transmitter 102 receives an input signal (Freq1-Freqn), modulates each respective signal (in this instance, for amplitude), and transmits a respective transmitter output optical signal to a polarization maintaining multiplexer 104.

Figure 1B:
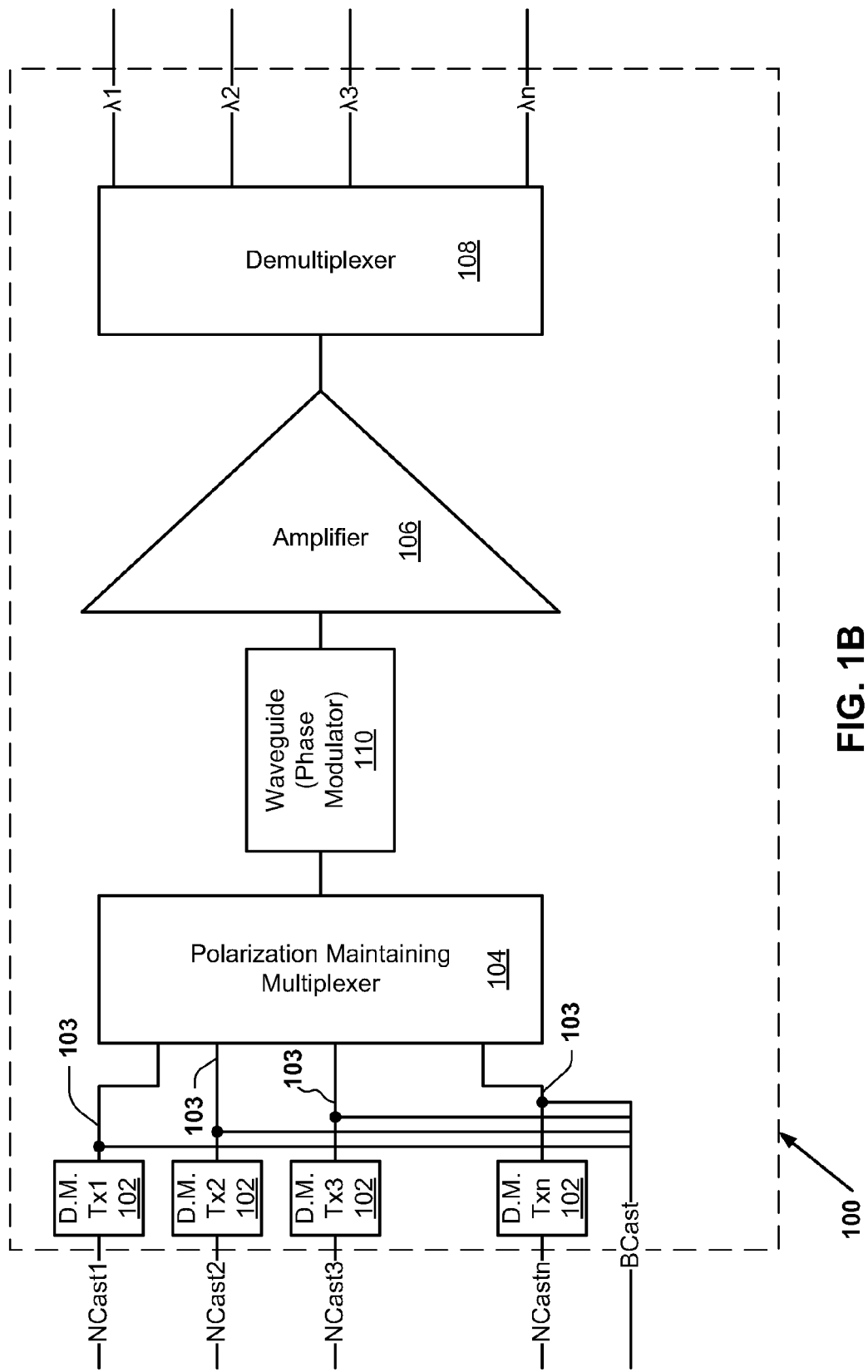
FIG. 1B depicts an example of a transamplifier in according to another embodiment according to the invention.
Figure 1C:
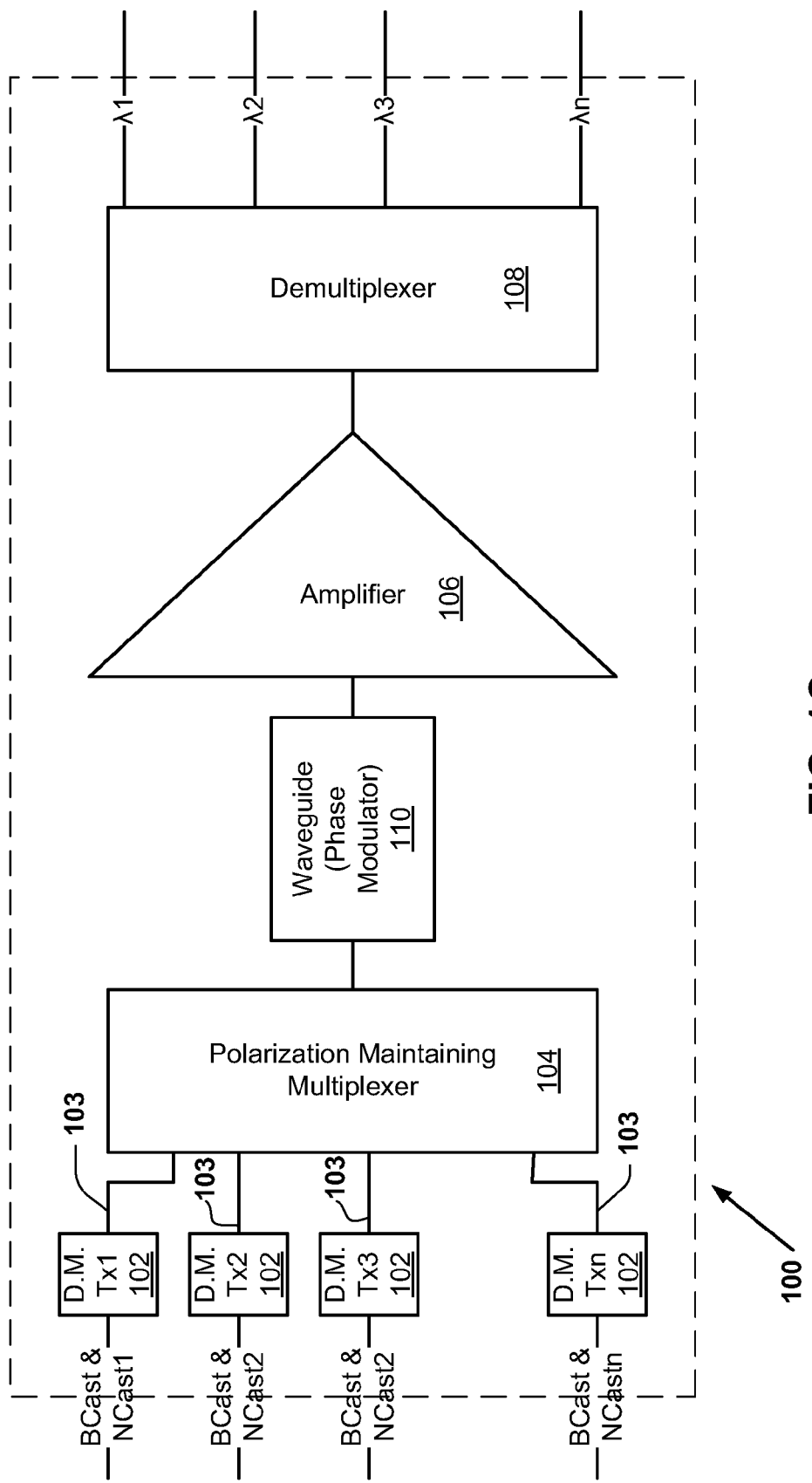
FIG. 1C depicts an example of a transamplifier in according to yet another embodiment according to the invention.

The input signals (freq1-freqn) can be comprised of broadcast information, directed information, narrowcast information, or any combination of broadcast, directed, and narrowcast information. Referring to FIGS. 1A-1C, it can be seen that there are various and numerous combinations of inputs that can be provided to the transamplifier. For instance, as shown in the embodiment of FIG. 1B, the input signals to the transamplifier are comprised of n narrowcast signals (NCast1-NCastn) and one broadcast signal (BCast) that is connected with each of the narrowcast signals. Similarly, in the example of FIG. 1C, each input signal includes a discrete narrow cast signal (NCast1-NCastn) in combination with a broadcast signal (BCast). It is to be appreciated that these are just a few input signal arrangements, and that numerous others are contemplated under the scope of the invention. The remaining components of the transamplifiers of FIGS. 1B and 1C can be substantially identical to that shown and described with respect to FIG. 1A. Accordingly, like reference characters are used in the Figures to identify corresponding parts, and reference can be made to the description of FIG. 1A for additional information about such features.

By way of example, as used herein an optical transmitter is a device that accepts an electrical signal as its input, processes this signal, and uses it to modulate an opto-electronic device, such as an LED or an injection laser diode, to produce an optical signal capable of being transmitted via an optical transmission medium. Directly modulated optical transmitters use an electrical signal to modulate the intensity of the light source (e.g., laser). Typically, the optical signal in the waveguide is modulated via an electro-optical effect, where the refractive index of the optical material reacts to changes in an electric field through the waveguide. Waveguides usually have an electro-optical coefficient rating that describes the susceptibility of the waveguide to modulate an optical signal.

A limitation on fiber optic transmission is that the amount of power inserted into a fiber by a non-modulated (i.e., single-tone) signal is generally limited to about 7 dBm. This is because, in part, electrostriction creates changes in the index of refraction of the fiber, which results in scattering (stimulated Brillouin scattering or "SBS"). When a signal is modulated, more power can be inserted into the fiber, but if this modulation occurs through a directly-modulated transmitter, it generally introduces non-linearities in the signal. Non-linearities are not as problematic with externally-modulated transmitters, however the external waveguides are costly on a per-unit basis, whereas directly-modulated transmitter are relatively less expensive.

In one embodiment, each optical transmitter 102 can comprise an external cavity laser (ECL). An ECL is generally comprised of a modulated laser and a fiber grating for tuning purposes. ECLs are generally an inexpensive form of a directly-modulated transmitter. In one aspect, an ECL as described in U.S. Pat. No. 6,125,222, issued to Anthon on Sep. 26, 2000, fully incorporated herein by reference and made a part hereof, can be used in the transamplifier 100, though other optical transmitters are contemplated as well. An ECL combined with an external waveguide overcomes many of the challenges presented by SBS and non-linearities, but at a significant expense. As another example, the optical transmitters 102 can be implemented as FTTH transmitters with SBS suppression technology as available from Scientific-Atlanta, Inc., a Cisco Company, of Lawrenceville, Ga.

The transmitter output signals can be provided with substantially the same polarization and delivered to the polarization maintaining multiplexer 104 via polarization maintaining fiber links, indicated at 103. As used herein, the phrase "substantially the same" is intended to mean that the system is designed to be the same, but due to manufacturing variations and tolerances and other practical considerations, the polarization may vary slightly (e.g., up to about ±5%) from the desired same polarization.

Alternatively, if the polarization of the output signals from transmitters 102 are not substantially the same, each link 103 can be configured to include means for adjusting the polarization so that the optical signals provided to the multiplexer 104 are substantially the same. For instance, such means for adjusting polarization in an optical fiber can include polarization controllers to convert or transform an input polarization state to a desired output polarization state. Polarization controllers, including multi-paddle polarization controllers or FiberBench polarization controllers, are available from Thorlabs, Inc. of Newton, N.J. Polarization controllers (or polarization transformers) commercially available from Boston Applied Technologies Incorporated, of Woburn, Mass., can be configured to convert any input state of polarization to any selectable output state of polarization by the application of voltage to independently controlled retardation plates. An example of an all-fiber polarization controller is described in Lyons, E. R.; Lee, H. P., *An efficient electrically tunable all-fiber polarization controller*, Optical Fiber Communication Conference, 2001 OSA Technical Digest Series (Optical Society of America, 2001), Volume 3, Page(s): WJ2-1-WJ2-3. Those skilled in the art will appreciate that various techniques and circuitry can be implemented to ensure that the optical signals provided to the optical multiplexer have substantially the same polarization. These and other polarization controllers can be interposed between the optical transmitters and the polarization maintaining multiplexer 104 for adjusting the polarization to be the same.

The output of each optical transmitter 102 is operatively connected via the link 103 with an input of the polarization maintaining multiplexer 104, as are known in the art to one of ordinary skill. The transmitter output optical signal of each optical transmitter 102, which is provided to the multiplexer 104, has a respective transmitted power level and polarization. As described above, the polarization of the optical signals input the multiplexer 104 is approximately the same for each channel. For example, in an instance where four transmitter output signals are provided to the multiplexer 104, the transmitted power levels of the respective transmitter output signals can each be 10 dBm, and each of the signals are provided with substantially the same polarization.

The multiplexer 104 can be a polarization maintaining optical multiplexer, as are known in the art, having a plurality of inputs and at least one output. The output of the multiplexer 104 is configured to transmit a combined optical signal comprised of the transmitter output optical signals having respective transmitted power levels corresponding the aggregate power of the transmitter output signals. The combined optical signal has a combined power level. The polarization-maintaining multiplexer 104 is also configured to preserve the polarization of the input signals provided via links 103 so as to be substantially the same as in the multiplexed output. As an example, polarization maintaining multiplexers are available commercially from Futurex Corporation of Santa Clara, Calif.

The combined optical signal, having a combined power level, in the example of FIG. 1A, is provided to the input of a waveguide or phase modulator 110. By modulating the amplitude (as provided by the D.M. transmitters 102), and the phase (by the waveguide 110), more power can be transmitted through the fibers that comprise a fiber optic network while maintaining a low SBS. It is also to be appreciated that phase and amplitude modulation can be performed by the waveguide 110 alone, or in combination with the D.M. transmitters 102. Similarly, the waveguide 110 can also perform amplitude modulation alone, if desired. Also, the use of an external waveguide can be used to reduce the effective linewidth and increase the fiber reach of the system. Furthermore, by use of an external waveguide, few non-linearities are introduced into the signal.

In one embodiment, the phase modulator 110 can be implemented as single external waveguide that is configured to modulate the phase of an optical signal provided at an input thereof. By use of a single external waveguide 110 to modulate the combined signal from the multiplexer 104, rather than a separate waveguide for each transmitter, overall cost of the transamplifier can be significantly reduced. By phase modulating the combined optical signal with the waveguide 110, a broader signal can be provided that is made up of discrete wavelengths having fewer non-linearities. As an example, one such waveguide 110 that may be used in embodiments according to an aspect of the invention is a lithium niobate ($LiNbO_3$) waveguide, although other types of optical and electro-optical modulators can be utilized. For example, lithium niobate waveguides are available from JDS Uniphase Corporation of Milpitas, Calif. as well as from other manufacturers.

In the example of FIG. 1A, the input of the optical amplifier 106 is operatively connected with the output of the waveguide 110. The optical amplifier 106 receives the combined optical signal from the waveguide 110, amplifies it, and transmits the amplified combined optical signal to its output. The optical amplifier 106 can be a cladding pumped amplifier or a solid state amplifier. The optical amplifier 106, for example, can be a single-doped, fiber-doped amplifier, such as a fiber-doped amplifier (e.g., EDFA).

In one aspect, the optical amplifier can be a multiple-doped, fiber-doped amplifier such as a cladding pumped amplifier such as the erbium (Er)-ytterbium (Yb) amplifier described in U.S. Pat. No. 5,225,925 issued to Grubb et al. on Jul. 6, 1993 and hereby incorporated by reference in its entirety, though other cladding pumped amplifiers are contemplated within the scope of this invention. In another aspect, the optical amplifier can be single-doped, doped-fiber amplifier such as an Erbium Doped Fiber Amplifier (EDFA), as are known in the art to one of ordinary skill. The EDFA can boost an optical signal. By way of example, an EDFA can comprise several meters of glass fiber doped with erbium ions. When the erbium ions are excited to a high energy state, the doped fiber changes from a passive medium to an active amplifying medium. In other aspects, the optical amplifier can be a solid-state amplifier or other amplifiers configured to amplify an optical signal.

The optical amplifier 106 has an output, and is further characterized as having a Relative Intensity Noise (RIN) level. Though RIN is a characteristic of an optical amplifier, it is also inherent in the transmitter laser and laser to modulator interaction, thus resulting in RIN produced by the transamplifier 100. Further RIN can be produced by the system or network to which the transamplifier is connected, and such RIN can be caused by intermodulation noise from transmitter, fiber, and fiber scattering; diode and electronic characteristics in the optical receiver module; and fiber non-linear interaction between multiple wavelengths. RIN degrades the RF signal to noise (CNR) parameter per channel over the whole operating band, the intermodulation noise creates harmonic beating effects (CSO from second orders, CTB from third orders) spread statistically throughout the operating band, and scattering phenomena appear due to the high launch powers necessary for cost effective delivery of signal. All of these, if unchecked, reduce the necessary quality of service. A characteristic of an optical amplifier is that the power level of an input signal to the amplifier affects the amount of RIN produced by the optical amplifier. For instance, if the power level of the input signal is above a threshold level ($P_{min}$), in some instances, the RIN produced by the optical amplifier is severely reduced or negligible. Further, for a cladding pumped amplifier, $P_{min}$ should be at a minimum level for proper operation of the cladding pumped amplifier. Typical $P_{min}$ levels for a cladding pumped amplifier can be about 15 dBm and about 5 dBm for an EDFA amplifier.

The transamplifier 100 also can include an optical demultiplexer 108, which has an input and a plurality of outputs. In one example, the input of the demultiplexer 108 is operatively coupled to the output of the optical amplifier 106. The optical demultiplexer 108 is configured to receive the amplified combined optical signal, split the amplified combined optical signal into a plurality of discrete output optical signals of varying power and wavelengths selections, and transmit each discrete output optical signal to one or more of the plurality of outputs of the demultiplexer 108. The wavelength selections can include a signal having a single wavelength (or channel), or a signal comprised of a plurality of wavelengths. The optical demultiplexer 108, for example, can be implemented as an optical demultiplexer card or module (e.g., the Cisco ONS 15454 4-Ch. 100 GHz Optical Demultiplexer card), such as are commercially available from Cisco Systems, Inc. or other vendors. These and other optical demultiplexers can include an array of optical filters (e.g., DROP filters) configured to extract optical channels at the selected wavelengths from the amplified combined optical signal.

Figure 1D:
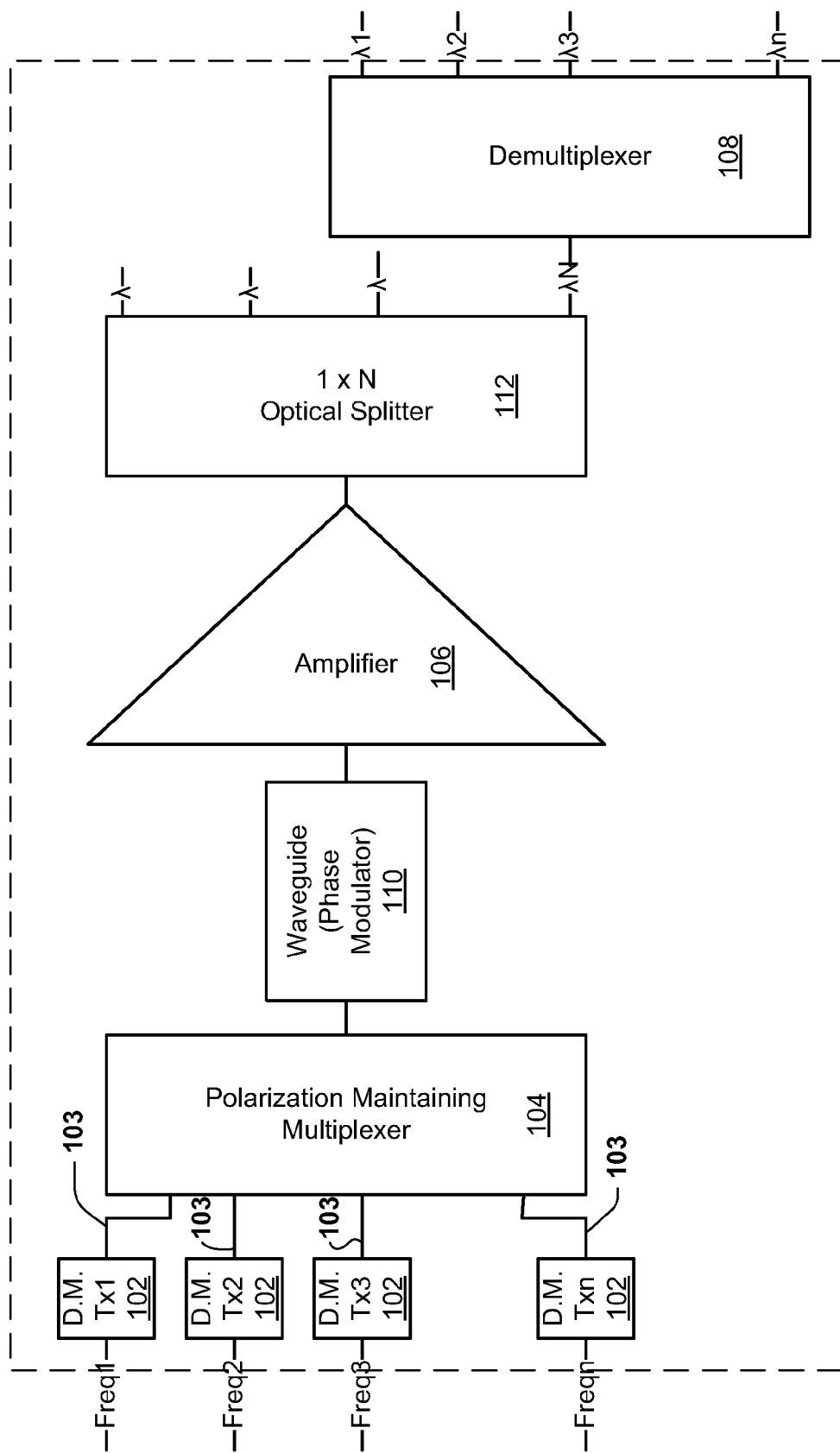
FIG. 1D depicts an example of a transamplifier in according to still another embodiment according to the invention.

The optical signal can be further spilt using, for example, a 1×N optical splitter, as are known in the art. For instance, as shown in FIG. 1D, the output of the optical amplifier 106 can be provided to an optical splitter 112. The optical splitter 112 splits the optical signal into a plurality of respective signals, such as at N pre-selected wavelengths or a range of wavelengths. Each of the respective outputs from the optical splitter 112 is then provided to one or more optical demultiplexer 108. It will be appreciated that the optical splitter 112 demonstrated in FIG. 1D is equally applicable to the embodiments depicted in FIGS. 1B, 1C and 1E. FIG. 1F demonstrates the use of an optical splitter in the context of the transamplifier of FIG. 1E.

Figure 1E:
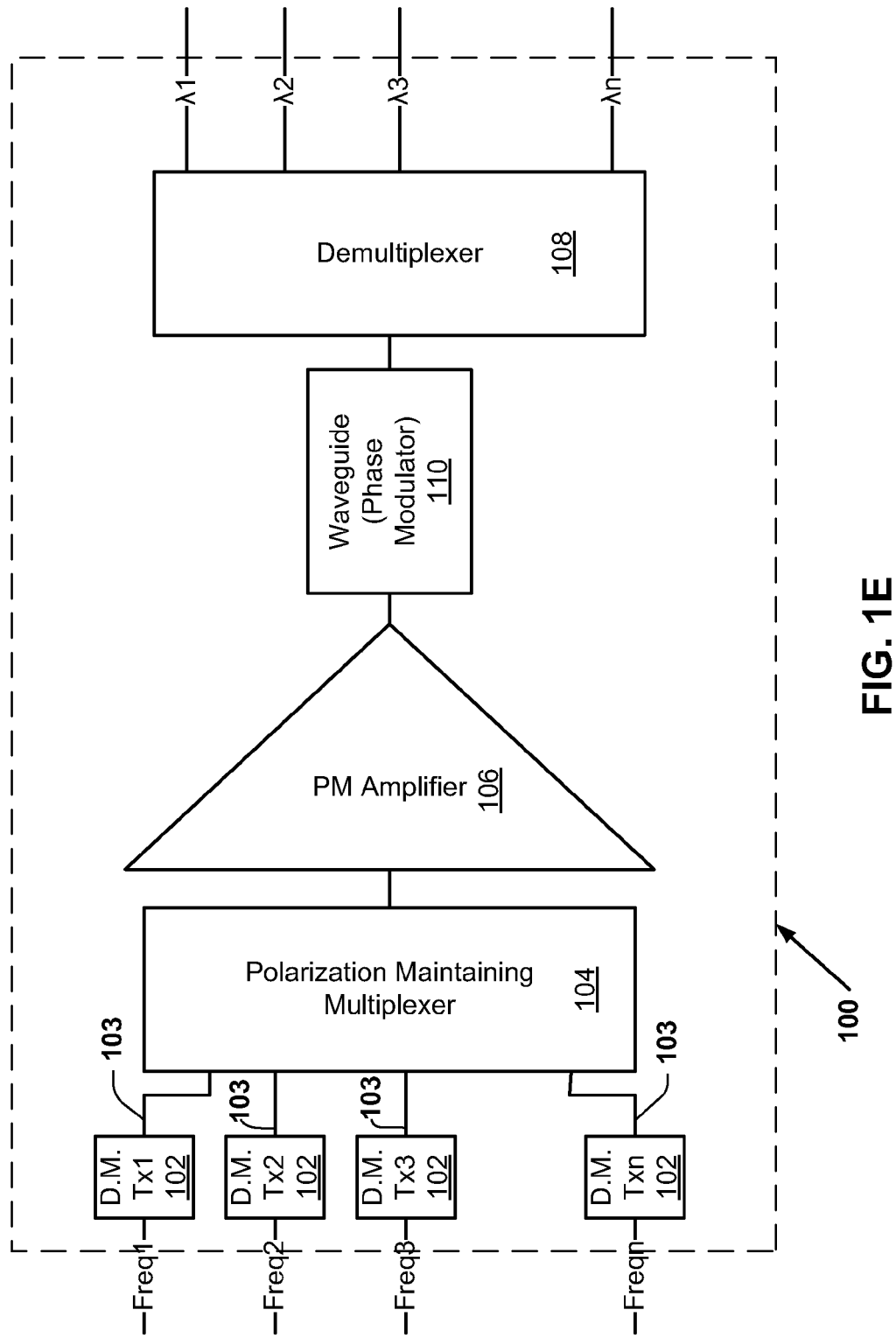
FIG. 1E depicts an example of a transamplifier in according to another embodiment according to the invention.
Figure 1F:
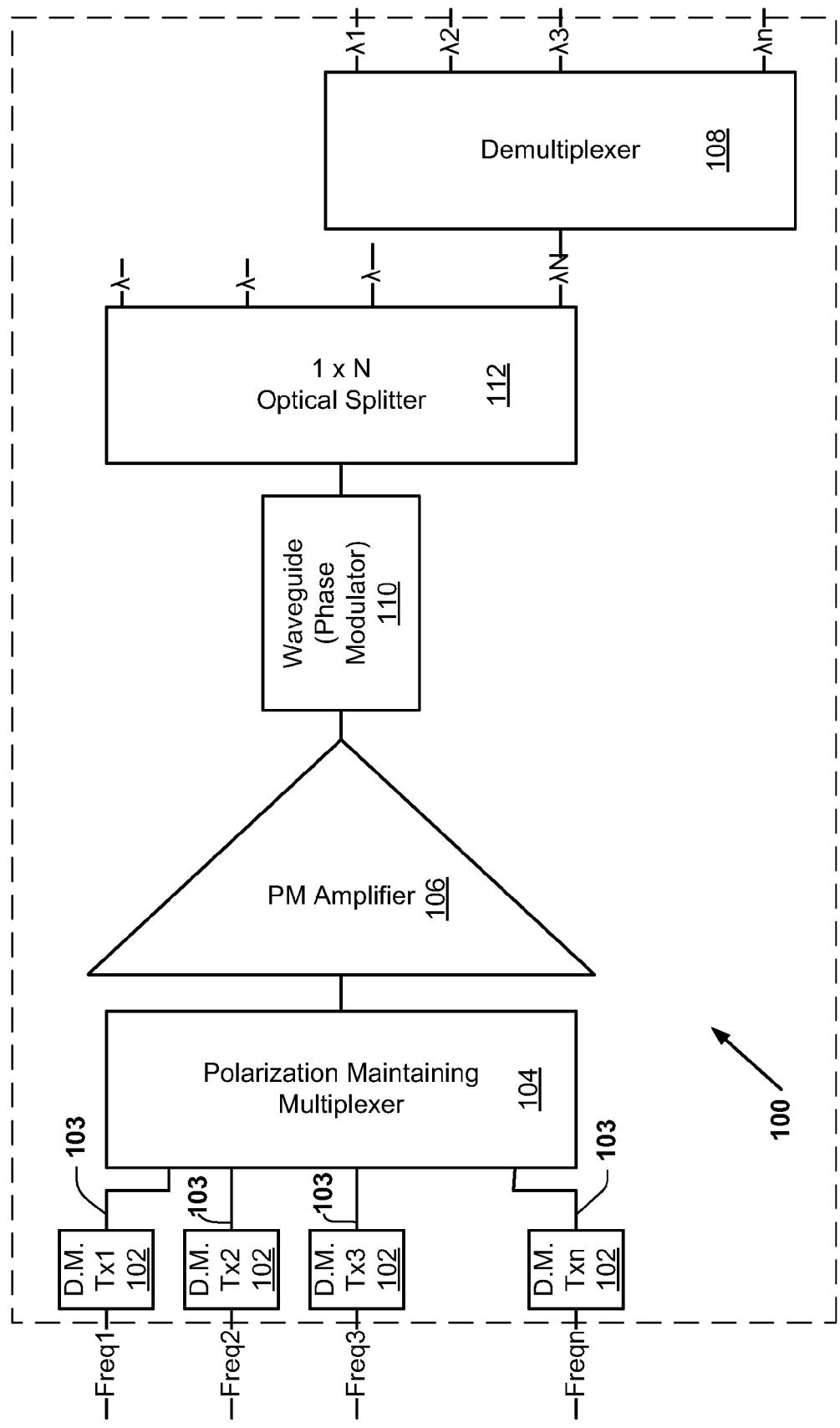
FIG. 1F depicts an example of a transamplifier in according to yet another embodiment according to the invention.

FIG. 1E is similar to the other examples of FIG. 1A, except that the order of the waveguide 110 and the optical amplifier 106 have been switched. Thus, briefly, the directly-modulated transmitters 102 each provides a directly modulated optical signal at a respective wavelength. The transmitter optical signals are provided with substantially the same polarization and with a power level (e.g., the power levels can be the same or different) to a polarization maintaining multiplexer 104 via respective optical links and couplings, indicated at 103. The optical links 103 are also polarization maintaining (or polarization adjusting) such that the input optical signals at the optical multiplexer 104 each has substantially the same polarization, as described herein. The polarization maintaining multiplexer 104, in turn, provides an optically multiplexed output signal to the optical amplifier 106, which output signal has a combined power and a given polarization state.

For the example transamplifier 100 in FIG. 1E, the optical amplifier 106 is implemented as a polarization maintaining optical amplifier that is configured to amplify and to maintain the polarization of the multiplexed optical output signal. Thus, the optical amplifier 106 generates an output signal with higher optical power than the input signal provided by the multiplexer 104. Various configurations and types of polarization maintaining optical amplifiers can be obtained for use in the transamplifier 100, including PM gain fiber amplifiers, semiconductor optical amplifiers and Raman amplifiers. The amplifier can be implemented as a module or as a series of stages to provide for desired amplification and polarization. Most optical amplifiers are either optically or electrically pumped.

As one example, the optical amplifier 106 can be an EDFA amplifier having a geometry that is configured to maintain polarization. To maintain polarization, the fiber can be implemented as a type of stress induced birefringent fiber (e.g., having one or more stress rods adjacent the core) or the fiber can be implemented as having a geometry that is configured to maintain polarization (e.g., having a non-circular core) of the output signals. Additionally, the amplifier can be implemented as including one or more stages, such as a concatenation of pre- and post-amplifier stages. Polarization maintaining semiconductor optical amplifiers and optical gain fibers can be obtained commercially from Thorlabs, Inc. of Newton, N.J. For these and other optical amplifiers polarization maintaining isolators and pigtails can be utilized at the inputs and outputs to help ensure that the input polarization state will be preserved in the amplified output signal.

A waveguide (phase modulator) 110 modulates the phase of amplified optical signal from the optical amplifier 106. By modulating the amplitude (as provided by the D.M. transmitters 102), and the phase (by the waveguide 110), more power can be transmitted through the fibers that comprise a fiber optic network while maintaining a low SBS. Additionally, by use of a single external waveguide 110 to modulate the amplified signal from the amplifier 106, which has been combined via the multiplexer 104, the overall cost of the transamplifier 100 can be reduced. Additionally, by phase modulating the amplified optical signal with the waveguide 110, a broader signal is provide that is made up of discrete wavelengths having little non-linearities. As mentioned above, one such waveguide 110 that may be used in embodiments according to an aspect of the invention is a lithium niobate ($LiNbO_3$) waveguide, although other types of optical and electro-optical modulators may be utilized.

As depicted in FIG. 1E, the waveguide 110 provides the modulated output signal to an optical demultiplexer 108. Alternatively, the output of the waveguide 110 can be provided to a splitter, such as the optical splitter 112 shown and described with respect to FIG. 1C, which can provide one or more outputs to the demultiplexer 108. The optical demultiplexer 108 is configured to receive the modulated optical signal, split the optical signal into a plurality of discrete output optical signals of varying power and wavelengths selections, and transmit each discrete output optical signal to one or more of the plurality of outputs of the demultiplexer 108. The wavelength selections can include a signal having a single wavelength (or channel), or a signal comprised of a plurality of wavelengths (or channels).

FIG. 1F demonstrates an example of a transamplifier 100 that includes an optical splitter 112 connected between the phase modulator 110 and an input of the demultiplexer 108 for the transamplifier configuration shown and described with respect to FIG. 1E. That is, the optical splitter 112 has one input that is coupled to receive the modulated combined and amplified signal from the phase modulator 110 and to split the corresponding signal into N signals provided at N outputs thereof. The optical splitter 112 provides one or more of its N signals to an input of the optical demultiplexer 108. The demultiplexer 108 thus receives a portion of the amplified combined optical signal from the optical splitter 112 and demultiplexes (e.g., via optical filtering) the signal into selected wavelengths such as described herein.

In operation, the combining of the transmitter output optical signals results in a combined optical signal having a combined power level. If this combined power level is greater than the threshold power level ($P_{min}$), then, if the optical amplifier is a cladding pumped amplifier, the amplifier is operational. This results in a transamplifier having an acceptable quality of a communications channel for each of the discrete output optical signals. The transamplifier 100 further allows a system operator to not only broadcast but also narrowcast to each individual group according to its differentiated needs. In one aspect, acceptable quality of a communications channel for each of the discrete output optical signals is determined by a signal to noise ratio (SNR). In another aspect, the acceptable quality of a communications channel for each of the discrete output optical signals is determined by a carrier to noise ratio (CNR). CNR from the perspective of a receiver operatively connected to the network comprised of a transamplifier, can be determined by the equation $$CNR = \left(\frac{1}{2 \cdot B}\right) \frac{m^2 \cdot I^2}{2e \cdot I + n^2 + RIN \cdot I^2},$$

where m is optical modulation per channel, I is an average received photocurrent, B is noise bandwidth per channel, n is thermal noise introduced by an optical receiver referred to the photocurrent, e is electron charge and RIN is the relative intensity noise of the system, including all parts of the transamplifier and its link interaction.

Figure 2:
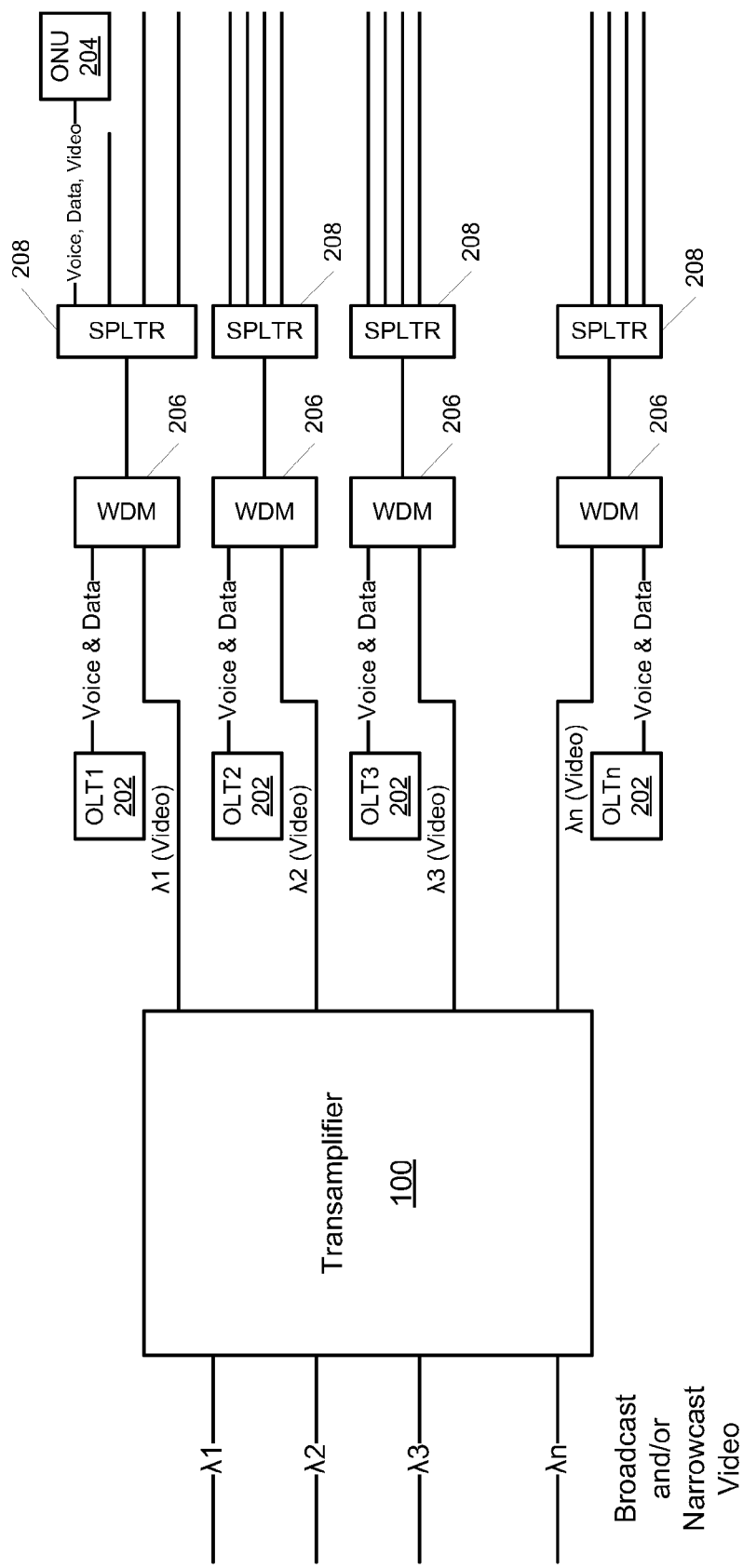
FIG. 2 depicts an example of a system for transporting video, voice and data over a fiber optic network in an embodiment according to the invention.

FIG. 2 is an illustration of a system for transporting video, voice and data over a fiber optic network in an embodiment according to an aspect of the invention. In FIG. 2, the system includes one or more optical line terminations (OLTs) 202 operatively coupled to a fiber-optic network. An OLT 202 is responsible for transmitting voice and data downstream to one or more ONUs 204, and allocating upstream bandwidth to the ONUs 204. Each ONU 204 is operatively coupled to the fiber-optic network. Further comprising the system is a transamplifier 100, as shown and described herein (see, e.g., FIGS. 1A, 1B, 1C, 1D, 1E and 1F). Information signals, such as, for example, video, whether broadcast, narrowcast, directed, combinations thereof, or otherwise are provided to the fiber optic network from the transamplifier 100 through one or more wavelength-division multiplexers (WDMs) 206.

The WDM 206 allows for the transmission of two or more signals by sending the signals at different wavelengths through the same fiber. The system can further comprise a splitter 208 to service a further plurality of end users. Each fiber leaving the splitter 208 can be coupled to an optical network unit, such as ONU 204. In one aspect, the fiber optic network is a passive optical network (PON), which are known in the art and further described herein.

Example Methods

In one embodiment, illustrated in FIG. 3, methods are provided for tuning a transamplifier. It will be understood that the method is equally applicable to all examples of transamplifiers shown and described herein, including FIGS. 1A, 1B, 1C, 1D, 1E and 1F. The method includes determining the desired characteristics for each of a plurality of output discrete optical signals from a transamplifier 302; providing a plurality of input signals to the inputs of the transamplifier 304; and analyzing each of the plurality of output discrete optical signals from the transamplifier respective to the desired characteristics for the output signals 306. At step 308, it is determined whether the desired characteristics (as determined in step 302) have been met, or substantially met. If not, then the process goes to step 310, where the transamplifier is adjusted to obtain the desired characteristics for the output signals. If, however, at step 308 it is determined that the desired characteristics (as determined in step 302) have been met, or substantially met, then the process goes to step 312, where it ends.

Determining the desired characteristics for each of a plurality of output discrete optical signals from a transamplifier 302 includes determining the desired power level for one or more of the plurality of output discrete optical signals; the wavelengths for one or more of the plurality of output discrete optical signals; the CNR for one or more of the plurality of output discrete optical signals; and carrier distortion ratios (e.g., composite second order (CSO) and composite triple beat (CTB)) for one or more of the plurality of output discrete optical signals, bit error rate (BER) and the like.

Adjusting the transamplifier to obtain the desired characteristics for the output signals (step 310) can include adjusting one or more of an amplitude of one or more of the plurality of input signals to the transamplifier; adjusting the wavelength of one or more of the plurality of input signals; adjusting input power associated with one or more of the plurality of input signals; adjusting output power of the one or more transmitters; adjusting power input to the optical amplifier; adjusting the wavelength of an amplification signal provided by the optical amplifier; adjusting the electronic pre-distortion of one or more of the plurality of input signals to the transamplifier; by selection or replacement of the components of the transamplifier including a laser having certain characteristics for the optical amplifier.

While the methods and systems have been described in connection with examples and embodiments, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

What have been described above are examples and embodiments of the invention. It is, of course, not possible to describe every conceivable combination of components or methodologies for purposes of describing the invention, but one of ordinary skill in the art will recognize that many further combinations and permutations of the present invention are possible. Accordingly, the invention is intended to embrace all such alterations, modifications and variations that fall within the scope of the appended claims.

What is claimed is:

1. A transamplifier comprising:
a plurality of directly modulated optical transmitters, each optical transmitter receives at least one input signal and transmits a corresponding transmitter output optical signal that is modulated based on the input signal, each transmitter output optical signal having a respective transmitted power level and polarization;
a polarization maintaining (PM) optical multiplexer having a plurality of inputs and at least one output, each transmitter output optical signal being provided to a respective one of the plurality of inputs with a substantially same polarization, the PM optical multiplexer being configured to transmit a combined optical signal that includes each of the corresponding transmitter output optical signals with the substantially same polarization;
a PM optical amplifier having an input and an output, the input of the PM optical amplifier receiving the combined optical signal, the PM optical amplifier transmits an amplified combined optical signal at the output of the PM optical amplifier such that the amplified combined optical signal has substantially the same polarization; and a phase modulator that receives the amplified combined optical signal, the phase modulator being configured to modulate the amplified combined optical signal and provide a corresponding modulated combined optical signal at an output of the phase modulator.

2. The transamplifier of claim 1, wherein the PM optical amplifier comprises a cladding pumped amplifier.

3. The transamplifier of claim 1, wherein a combined power level of the combined optical signal is greater than a threshold power level ($P_{min}$) at the input of the PM optical amplifier such that the PM optical amplifier is operational and RIN characteristics associated with the PM optical amplifier are substantially mitigated.

4. The transamplifier of claim 1, wherein the at least one of the plurality of directly modulated optical transmitters comprise an external cavity laser (ECL).

5. The transamplifier of claim 1, wherein the phase modulator comprises a $LiNbO_3$ waveguide.

6. The transamplifier of claim 1, further comprising an optical demultiplexer having an input and a plurality of outputs, wherein the input is configured to receive at least a portion of the corresponding phase-modulated combined optical signal and to split the amplified combined optical signal into a plurality of discrete output optical signals of varying power and wavelength selections, the optical demultiplexer providing each of the plurality of discrete output optical signals to one of the plurality of outputs of the optical demultiplexer.

7. The transamplifier of claim 6 implemented in a system for transporting voice, data and video signals over a fiber optic network, comprising, the system further comprising:

an optical line termination (OLT) operatively coupled to the fiber-optic network;

an optical network unit (ONU) operatively coupled to the fiber-optic network, the transamplifier being operatively coupled to transmit the plurality of discrete output optical signals via the fiber-optic network;

at least one wavelength-division multiplexer (WDM), the at least one WDM combining the plurality of discrete output optical signals from the optical demultiplexer with voice and data signals from the OLT using and transporting the combined signals to the ONU via the fiber-optic network.

8. The transamplifier of claim 1, further comprising an optical splitter having one input and N outputs, the optical splitter splitting the corresponding modulated combined optical signal into N signals.

9. The transamplifier of claim 8, further comprising an optical demultiplexer coupled to at least one of the N outputs of the optical splitter to receive a portion of the amplified combined optical signal from the optical splitter.

10. The transamplifier of claim 1, further comprising a plurality of optical links, each being coupled between an output of each of the plurality of directly modulated optical transmitters and a respective input of the PM optical multiplexer, each of the plurality of optical links providing each respective transmitter output optical signal to the respective one of the plurality of inputs with the substantially same polarization.

11. The transamplifier of claim 10, wherein each of the plurality of optical links comprises a PM optical fiber.

12. The transamplifier of claim 10, wherein each of the plurality of optical links comprises a polarization controller that is configured to adjust the polarization of at least some of the corresponding transmitter output optical signals so that each respective transmitter output optical signal is provided to the respective one of the plurality of inputs with the substantially same polarization.

13. A system for transporting voice, data and video signals over a fiber optic network, comprising:

an optical line termination (OLT) operatively coupled to the fiber-optic network;

an optical network unit (ONU) operatively coupled to the fiber-optic network; and a transamplifier operatively coupled to the fiber-optic network, wherein the transamplifier comprises:

a plurality of directly modulated optical transmitters, each optical transmitter receives at least one input signal and transmits a corresponding transmitter output optical signal that is modulated based on the input signal, each transmitter output optical signal having a respective transmitted power level and polarization;

a polarization maintaining (PM) optical multiplexer having a plurality of inputs and at least one output, each transmitter output optical signal being provided to a respective one of the plurality of inputs with a substantially same polarization, the PM optical multiplexer being configured to transmit a combined optical signal that includes each of the corresponding transmitter output optical signals with the substantially same polarization;

a PM optical amplifier having an input and an output, the input of the PM optical amplifier receiving the combined optical signal, the PM optical amplifier transmits an amplified combined optical signal at the output of the PM optical amplifier such that the amplified combined optical signal has substantially the same polarization; and a phase modulator that receives the amplified combined optical signal, the phase modulator being configured to modulate the amplified combined optical signal and provide a corresponding modulated combined optical signal at an output of the phase modulator; and an optical demultiplexer having an input and a plurality of outputs, wherein the input is configured to receive at least a portion of the corresponding phase-modulated combined optical signal and to split the amplified combined optical signal into a plurality of discrete output optical signals of varying power and wavelength selections, the optical demultiplexer providing each of the plurality of discrete output optical signals to one of the plurality of outputs of the optical demultiplexer; and at least one wavelength-division multiplexers (WDMs), the at least one WDM combining the plurality of discrete output optical signals of the transamplifier with voice and data signals from the OLT and transporting the combined signals to the ONU through the fiber-optic network.

14. The system of claim 13, wherein the fiber optic network is a passive optical network (PON).

15. The system of claim 13, wherein each of the plurality of directly modulated optical transmitters comprises an external cavity laser (ECL).

16. The system of claim 13, wherein the phase modulator comprises a $LiNbO_3$ waveguide.

17. The transamplifier of claim 13, further comprising a plurality of optical links, each of the plurality of optical links being coupled between an output of each of the plurality of directly modulated optical transmitters and a respective input of the PM optical multiplexer, each of the plurality of optical links providing each respective transmitter output optical signal to the respective one of the plurality of inputs with the substantially same polarization.

18. The transamplifier of claim 17, wherein each of the plurality of optical links comprises a PM optical fiber.

19. The transamplifier of claim 17, wherein each of the plurality of optical links comprises a polarization controller that is configured to adjust the polarization of at least some of the corresponding transmitter output optical signals so that each respective transmitter output optical signal is provided to the respective one of the plurality of inputs with the substantially same polarization.

20. A method of tuning a transamplifier comprising:
providing a plurality of input signals to a transamplifier, the transamplifier comprising:
   a plurality of directly modulated optical transmitters, each optical transmitter receives at least one input signal and transmits a corresponding transmitter output optical signal that is modulated based on the input signal, each transmitter output optical signal having a respective transmitted power level and polarization;
   a polarization maintaining (PM) optical multiplexer having a plurality of inputs and at least one output, each transmitter output optical signal being provided to a respective one of the plurality of inputs with a substantially same polarization, the PM optical multiplexer being configured to transmit a combined optical signal that includes each of the corresponding transmitter output optical signals with the substantially same polarization;
   a PM optical amplifier having an input and an output, the input of the PM optical amplifier receiving the combined optical signal, the PM optical amplifier transmits an amplified combined optical signal at the output of the PM optical amplifier such that the amplified combined optical signal has substantially the same polarization; and
   a phase modulator configured to modulate the amplified combined optical signal and provide a corresponding modulated combined optical signal at an output of the phase modulator; and
adjusting parameters of the transamplifier to obtain desired characteristics for the modulated combined optical signal provided at the output of the waveguide.

* * * * *